United States Patent
Altinger et al.

(10) Patent No.: US 9,995,585 B2
(45) Date of Patent: Jun. 12, 2018

(54) METHOD FOR NAVIGATION OF A USER BETWEEN A FIRST POSITION WITHIN A BUILDING AND A SECOND POSITION

(71) Applicant: Audi AG, Ingolstadt (DE)

(72) Inventors: Harald Altinger, Gerolfing (DE); Florian Schuller, Ismaning (DE)

(73) Assignee: Audi AG, Ingolstadt (DE)

( * ) Notice: Subject to any disclaimer, the term of this patent is extended or adjusted under 35 U.S.C. 154(b) by 0 days. days.

(21) Appl. No.: 15/508,835

(22) PCT Filed: Jul. 11, 2015

(86) PCT No.: PCT/EP2015/001424
§ 371 (c)(1),
(2) Date: Mar. 3, 2017

(87) PCT Pub. No.: WO2016/034258
PCT Pub. Date: Mar. 10, 2016

(65) Prior Publication Data
US 2017/0284810 A1    Oct. 5, 2017

(30) Foreign Application Priority Data
Sep. 6, 2014  (DE) ........................ 10 2014 013 208

(51) Int. Cl.
*G01C 21/20* (2006.01)
*G08G 1/13* (2006.01)
*H04W 4/04* (2009.01)

(52) U.S. Cl.
CPC ............. *G01C 21/206* (2013.01); *G08G 1/13* (2013.01); *H04W 4/046* (2013.01)

(58) Field of Classification Search
CPC ........ G01C 21/206; G08G 1/13; H04W 4/046
(Continued)

(56) References Cited

U.S. PATENT DOCUMENTS

| 6,650,999 B1 | 11/2003 | Brust et al. |
| 2008/0059199 A1 | 3/2008 | Hataoka et al. |

(Continued)

FOREIGN PATENT DOCUMENTS

| DE | 19923750 A1 | 11/1999 |
| DE | 10051406 A1 | 5/2002 |

(Continued)

OTHER PUBLICATIONS

EPO english translation DE-102014013207-A1.*

(Continued)

*Primary Examiner* — Yazan A Soofi
(74) *Attorney, Agent, or Firm* — Sterne, Kessler, Goldstein & Fox, PLLC

(57) ABSTRACT

A method for navigating a user between a first position within a building and a second position, or vice versa, includes creating, by a motor vehicle, map information describing at least one partial area of the building based on vehicle environment information created at the motor vehicle that describes objects in the environment around the motor vehicle. The method further includes providing, by the motor vehicle, parking information including a park position of the motor vehicle within the building and transferring the map information and the parking information to a mobile communication device. The mobile communication device is configured to create navigation information containing at least one navigation route between the first position and the second position, based on the transferred map information and the transferred parking information. The mobile communication device is configured to navigate the user between the first position and the second position using the navigation information.

19 Claims, 1 Drawing Sheet

(58) Field of Classification Search
USPC .......................................................... 701/434
See application file for complete search history.

(56) References Cited

U.S. PATENT DOCUMENTS

| | | | | |
|---|---|---|---|---|
| 2009/0043490 | A1* | 2/2009 | Jung | G01C 21/20 |
| | | | | 701/533 |
| 2009/0058685 | A1* | 3/2009 | McCall | G08G 1/005 |
| | | | | 340/995.24 |
| 2009/0098907 | A1* | 4/2009 | Huntzicker | G01C 21/12 |
| | | | | 455/556.1 |
| 2009/0251333 | A1 | 10/2009 | Itani et al. | |
| 2010/0121567 | A1* | 5/2010 | Mendelson | G01C 21/206 |
| | | | | 701/467 |
| 2010/0211307 | A1* | 8/2010 | Geelen | G01C 21/265 |
| | | | | 701/533 |
| 2010/0219010 | A1* | 9/2010 | Kadowaki | B62D 15/0285 |
| | | | | 180/204 |
| 2012/0316774 | A1* | 12/2012 | Yariv | G01C 21/26 |
| | | | | 701/423 |
| 2014/0336920 | A1* | 11/2014 | Burrell | G01C 21/206 |
| | | | | 701/409 |

FOREIGN PATENT DOCUMENTS

| | | | | |
|---|---|---|---|---|
| DE | 102008050960 | A1 | 6/2009 | |
| DE | 102009006471 | A1 | 9/2010 | |
| DE | 102014007794 | A1 | 10/2014 | |
| DE | 102014013207 | A1 * | 8/2015 | ........... G01C 21/206 |
| DE | 102014013207 | A1 | 8/2015 | |
| WO | WO 2010/051510 | A2 | 5/2010 | |

OTHER PUBLICATIONS

English-language abstract of German Patent Application Publication No. 100 51 406 A1, published May 2, 2002; 1 page.
English-language abstract of German Patent Application Publication No. 10 2008 050 960 A1, published Jun. 10, 2009; 1 page.
English-language abstract of German Patent Application Publication No. 10 2014 007 794 A1, published Oct. 23, 2014; 1 page.
English-language abstract of German Patent Application Publication No. 10 2009 006 471 A1, published Sep. 2, 2010; 2 pages.
English-language abstract of German Patent Application Publication No. 10 2014 013 207 A1, published Aug. 27, 2015; 2 pages.
International Search Report and Written Opinion of the International Searching Authority directed to related International Patent Application No. PCT/EP2015/001424, dated Oct. 2, 2015, with attached English-language translation; 22 pages.
International Written Opinion of the Authority in Charge of International Preliminary Examination directed to related International Patent Application No. PCT/EP2015/001424, dated Jul. 25, 2016, with attached English-language translation; 17 pages.
International Preliminary Report on Patentability directed to related International Patent Application No. PCT/EP2015/001424, dated Nov. 16, 2016, with attached English-language translation; 14 pages.
Notification of Formless Discussions with the Applicant directed to related International Patent Application No. PCT/EP2015/001424, dated Oct. 14, 2016, with attached English-language translation; 7 pages.

* cited by examiner

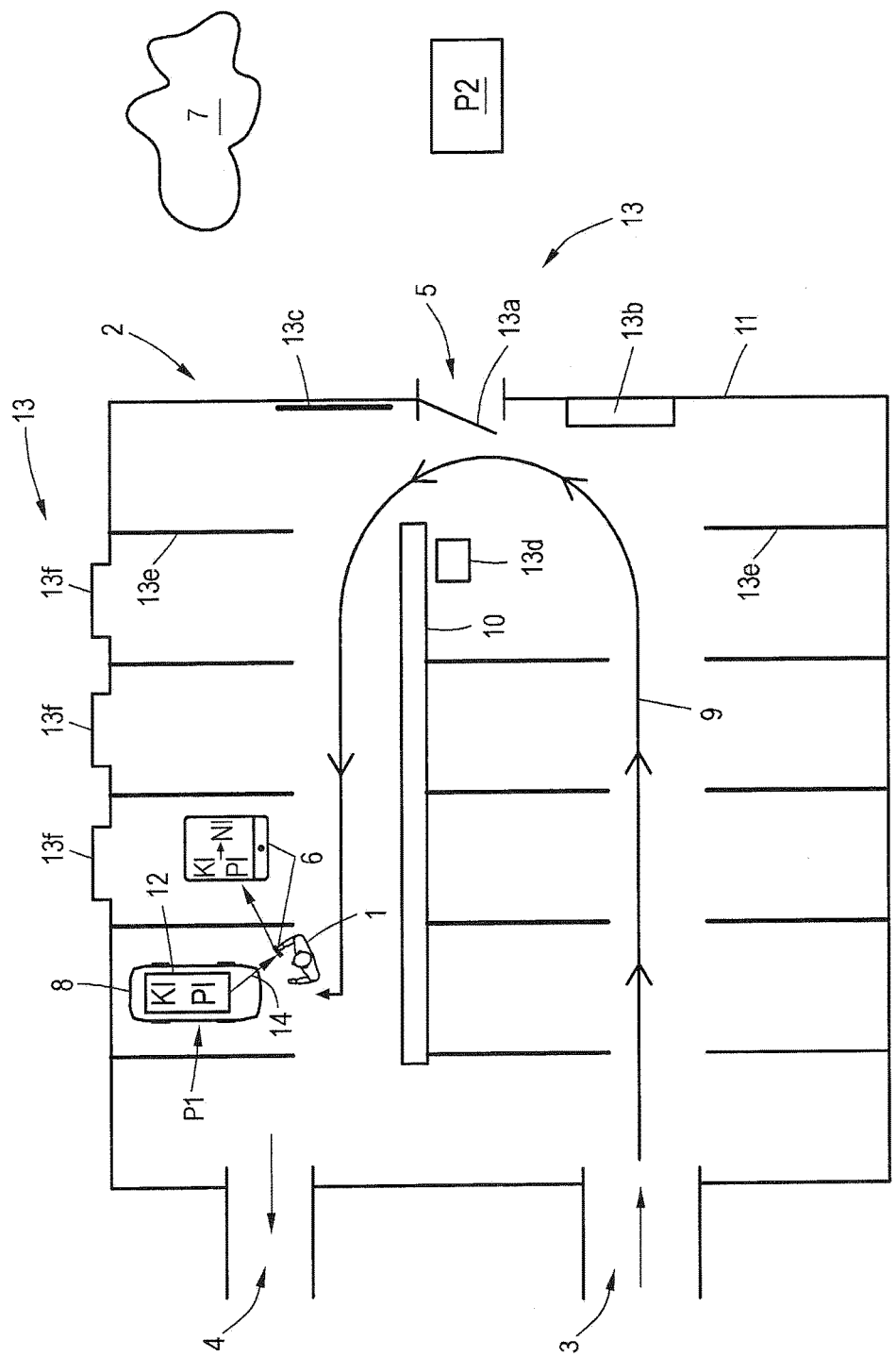

METHOD FOR NAVIGATION OF A USER BETWEEN A FIRST POSITION WITHIN A BUILDING AND A SECOND POSITION

TECHNICAL FIELD

The invention relates to a method for navigation of a user between a first position within a building—wherein the first position is a park position of a motor vehicle parked in the building—and a second position, or vice versa.

BACKGROUND

It is known to realize user-side navigation processes between two different positions, i.e., a starting position and a destination position, by means of mobile communication devices, for example cell phones, smartphones and the like. For this it is necessary in particular that the mobile communication device realizing the respective navigation process is connected with a data or communication network (typically a mobile phone network) in order to realize a localization or positioning of the user in a cartographic environment, and thus to realize a navigation process between the two positions.

As is known, there are building regions that in particular are situated below the surface of the earth, for example underground garages, in which a network reception—and accordingly a connection of a mobile communication device with a data or communication network—is not possible, or is possible only with limitations. A navigation process, for example starting from a motor vehicle parked in an underground garage, consequently may not be realized, or may be realized only with limitations.

The navigation may additionally be hindered if no cartographic data (shortened to map data) are present for corresponding buildings or building areas from which or into which navigation should take place.

A method for operating a vehicle guidance system is known from DE 10 2014 007 794 A1, wherein a position determination of the vehicle by means of coupled navigation using a movement direction of the vehicle and a velocity of the vehicle is implemented at least in regions without available satellite-supported navigation signal.

From US 2009/0 251 333 A1, a method is known in which an image acquisition device records images of the environment in the direction of travel upon driving into a parking garage. A user of the motor vehicle may have the images displayed (on a mobile telephone, for example) in order to find the motor vehicle again.

From US 2009/0 058 685 A1, a mobile communication device is known that may guide a user to his parked vehicle. It is therefore possible to guide the user back to his motor vehicle by means of images of the environment of the parked vehicle and local map information.

DE 199 23 750 A1 describes a device and a method with the aid of which a driver may locate his parked car again. For this, in the parking process the information about the current site of the motor vehicle is stored by a navigation system of the motor vehicle on a mobile device that the driver may carry with him. The driver therefore can have the site of the motor vehicle displayed on the mobile device.

A method for operating a navigation device of a motor vehicle is known from DE 10 2009 006 471 A1, wherein the navigation device determines the position and/or the driving route of the motor vehicle with the aid of basic geographic data present at the motor vehicle.

From US 2008/0 059 199 A1, a method is also known in which the information signs may be detected in order to implement a route guidance together with a speech input of a user.

BRIEF DESCRIPTION OF THE DRAWINGS/FIGURES

FIG. 1 illustrates a platform for a method for navigating a user between a first position and a second position.

DETAILED DESCRIPTION

The invention is based on the object to specify an improved method for navigation of a user between a first position within a building and a second position, or vice versa.

The object is achieved via a method of the aforementioned type. The method includes the following steps:
creation by the motor vehicle of a map information describing at least one partial area of the building, on the basis of a vehicle environment information created at the motor vehicle and describing objects in the environment around the motor vehicle,
provision, by the motor vehicle, of a parking information including a park position of the motor vehicle within the building,
transfer of the map information and the parking information from the motor vehicle to a user-side mobile communication device,
creation, by the user-side mobile communication device, of navigation information containing at least one navigation route between the first position and the second position, based on the transferred map information and the transferred parking information, and
navigation of the user from the first position to the second position by means of the mobile communication device, on the basis of the navigation information.

The method generally serves for the navigation of a user between a first position and a second position, or vice versa. Depending on whether the first or the second position serves as a starting point, either the second position or the first position may be designated or considered as a destination position.

The first position is located in a building or in a building area, i.e. in part of a building. The first position is thereby especially located in a building area in which no network coverage (and thus no network reception) is present for a user-side mobile communication device (shortened in the following to communication device). At the first position, the communication device possibly is not or cannot be connected with a data or communication network (e.g., in particular a mobile phone network), or can do so only with noticeable limitation. A corresponding first position may accordingly be in a building area situated below the surface of the earth, for example. For example, such a building area may be a lower level of a parking garage or a level of an underground garage. Typically, no cartographic data (shortened to map data) exists for the building or building area containing the first position. As arises in the following, however, corresponding map data may be created on the part of the motor vehicle.

The second position may likewise be located in a building or in a building area, i.e. in part of a building. However, the second position may also be located outside of the building. Insofar as the second position is likewise located in a building or in a building area, it may be such a building area in which a or no network coverage, or no network reception, is present for the or a corresponding communication device.

In a first step of the method, a map information is created on the part of the motor vehicle, consequently at the motor vehicle. The map information describes at least a partial area of the building. The map information is created on the basis of, i.e. generally while incorporating, a vehicle environment information created at the motor vehicle. The vehicle environment information describes objects, articles etc. in the environment around the motor vehicle. The vehicle environment information is appropriately created by means of at least one (typically multiple) motor vehicle-side acoustic and/or optical detection sensors for detection of objects in the environment around the motor vehicle. For example, corresponding detection sensors may be sensors based on cameras, lasers, radar or ultrasound, for example. Corresponding detection sensors may also be designed as cameras or comprise cameras. Naturally, a suitable control device is present which converts (in the sense of data) the detection data delivered by corresponding detection sensors into corresponding map data, and thus into a corresponding map information, based on suitable algorithms, for example. The creation of the map information may thereby take place by means of algorithms, for example as they are implemented in what are known as Simultaneous Localization and Mapping methods, abbreviated as SLAM methods.

The vehicle environment information that forms the basis for the creation of the map information is created expediently on the basis of at least one part of corresponding detection data which map the vehicle environment from the entrance of the motor vehicle into the building or the respective building area in which the motor vehicle is turned off or parked, up to the stopping or parking space of the motor vehicle. The vehicle environment information accordingly generally includes at least a portion of the objects located in the vehicle environment, which objects have been detected in a defined building area since the entrance of the motor vehicle into the building, up to the stopping or parking space of the motor vehicle.

Objects at the building, generally designated as building-side semantic features or landmarks, may be extracted from the vehicle environment information and stored, specially labeled (in terms of data), in the created map information. The map information may be augmented accordingly with defined building-side objects in that the latter are stored, specially labeled, in the map information. Correspondingly extracted building-side objects may significantly simplify the navigation taking place by means of the communication device. The extraction of building-side objects from the vehicle environment information takes place by means of suitable extraction algorithms as they are implemented for edge detection, for example, especially also within the scope of the aforementioned SLAM method. Especially normal or standardized objects, for examples doors or defined signs (for example signs for emergency exits) are thereby comparably simple to detect due to their normalized or standardized dimensions, shapes and possibly colorations.

Corresponding extractable or extracted building-side objects may generally be objects or articles that are structurally inseparable from the building or a specific building area, or objects or articles that are connected the building or a specific building area so as to be (non-destructively) separable. In the context of corresponding building-side objects, building-side operating devices (for example automatic payment machines), signs (of emergency exits, for example), roadway markings, fire extinguishers, windows, doors, posters, barcodes or QR tags etc. are referenced merely as examples.

In a second step of the method, parking information is provided on the part of the motor vehicle. The parking information provided to the motor vehicle contains a park position of the motor vehicle within the building or building area. Data about the position of a stopping location or of a parking space of the motor vehicle within the building or within the building area are thus present in the parking information. The provision of a parking information in particular means the transfer of this from a data server storing corresponding parking information to the motor vehicle, i.e. into a data storage at the motor vehicle, or the creation of a corresponding parking information on the part of the motor vehicle. A data server storing corresponding parking information may likewise be provided on the part of the building.

The map information and the parking information may be connected to one another in terms of data (merged, for example) so that a corresponding park position mapped via the parking information may be referenced with map data of the building or of the building area that are mapped via a map information.

In a third step of the method, the map information as well as parking information are transferred from the motor vehicle to the or a corresponding communication device. For this, a suitable data or communication connection is to be formed or established between the motor vehicle (e.g., in particular a transmission device at the motor vehicle) and the communication device (e.g., in particular a reception device at the communication device). After the transfer, the map information as well as the parking information are accordingly (also) present in the communication device and may in principle be processed there for various purposes.

At this point it is noted that a corresponding communication device may be a cell phone, a smartphone, a tablet, a laptop or the like, for example. It is also conceivable that a corresponding communication device is a mobile navigation device.

The transfer of the map information and the parking information on the part of the motor vehicle, to the corresponding communication device, typically takes place via a data or communication connection existing directly or indirectly, especially wireless, between the motor vehicle and the communication device. For example, it may thereby be a Bluetooth connection or a wireless network connection on the part of the building and/or motor vehicle, for example a local building-side and/or motor vehicle-side WLAN.

Within the scope of the described method, the map information and the parking information are processed on the part of the communication device in context with a navigation of the user realized via said communication device. Accordingly, in a fourth step of the method a navigation information is created by the communication device on the basis of—meaning generally while also incorporating—the transferred map information and the transferred parking information. The navigation information includes at least one navigation route between the first position and the second position, meaning at least one distance to be traveled by the user in order to arrive from the first position at the second position. Insofar as the created navigation information includes multiple navigation routes, a selection possibility of which navigation route he would like to take may be provided to the user.

In a fifth step of the method, a navigation of the user from the first position to the second position takes place on the basis of—meaning generally while incorporating—the navigation information. Acoustic and/or optical and/or haptic signals are thus provided to the user via output means present at the mobile communication device, using which signals he can be navigated from the first position to the second position by means of the communication device. Concretely, graphical elements (arrows, for example) may thereby be presented to the user on a display of the communication device, for example, which graphical elements indicate to him the path from the first position to the second position.

The described method enables a navigation by means of a corresponding communication device even in or through (a) building-side area(s) for which no map data are present and/or in which no network coverage or no network reception is present. It is thereby essential that a corresponding map information and a corresponding parking information are initially created or provided at the motor vehicle and are subsequently transferred to the communication device independently of the network reception of said communication device, i.e. independently of whether the communication device is connected with a data or communication network, in particular a mobile phone network. For the transfer, a suitable data or communication connection is only to be formed or established between the motor vehicle and the communication device. The communication device does not need to be connected with a (global) data or communication network, in particular a mobile phone network, to form or establish such a data or communication connection. The data or communication connection between the motor vehicle and the communication device is typically a local, possibly time-limited data or communication connection for the purpose of the transfer of a corresponding map information or a corresponding parking information.

For example, the provision of the parking information may take place by means of motor vehicle-side position determination devices to determine the position of the motor vehicle within the building, and/or building-side position determination devices to determine the position of the motor vehicle within the building. The motor vehicle may therefore determine its park position via position determination devices associated with it, which may likewise be acoustic and/or optical position sensors, for instance based on cameras, lasers, radar or ultrasound. Corresponding position determination devices may access the same motor vehicle-side sensors as corresponding motor vehicle-side detection devices. As mentioned in the preceding, the parking information may therefore be created on the part of the motor vehicle. In particular, the motor vehicle may hereby incorporate the provided map information, e.g., match or reference positions of the motor vehicle that were determined via corresponding position determination devices with the map information. Alternatively or additionally, the park position of the motor vehicle may be determined via building-side position determination devices, which may likewise, for example, be acoustic and/or optical position sensors, for instance based on cameras, lasers, radar or ultrasound. Movements of the motor vehicle within or through the building up to a park position may be tracked via corresponding building-side position determination devices, and said park position may thus be mapped. A park position determined on the part of the building, contained in a corresponding parking information, may be stored in a data server (that is in particular provided building-side) and be transferred to the motor vehicle.

From the preceding statements, it results that the provision of the parking information can also take place via a building-side park position server in which are present possible building-side park positions (e.g., in particular free parking spaces) for the motor vehicle. A building-side park position server may be a corresponding data server storing park positions determined on the part of the building. It is thereby possible that a possible park position is assigned to the motor vehicle by the building-side park position server.

It is possible that the communication device creates environment information describing an object in the environment around the communication device. In contrast to the vehicle environment information created on the part of the motor vehicle, the environment information created on the part of the communication device describes objects in the environment around the communication device, such that it is not the motor vehicle but rather the communication device that serves as a reference point. Moreover, statements above analogously apply in connection with the vehicle environment information created vehicle-side. For example, it is consequently also possible to extract specific building-side objects from the environment information via suitable extraction algorithms at the communication device.

It may advantageously be provided that (possibly extracted) building-side objects in the environment around the communication device, said objects being described in the environment information created by means of the communication device, are matched with (possibly extracted) building-side objects described in the map information transferred to the communication device. The navigation by means of the communication device may hereby be significantly simplified, e.g., in particular via the matching of objects detected on the part of the communication device with objects detected on the part of the vehicle. In particular, the plausibility of objects detected on the part of the communication device and on the part of the motor vehicle may be validated.

It is conceivable that an additional map information describing at least a partial area of the building may be provided via the user-side mobile communication device and is transferred to the motor vehicle. The map information provided on the part of the communication device may be loaded at the communication device, for example from a data or communication network (in particular a mobile phone network), which is naturally only possible if the communication device is connected with such a network. This is typically possible only outside of a building area in which no network coverage, and thus no network reception, is present at the communication device. The motor vehicle may, for example, be navigated—in particular in an at least partially automated manner—on the basis of the map information transferred from the communication device to the motor vehicle. Naturally, the map information transferred on the part of the communication device to the motor vehicle may be merged with map information created previously on the part of the motor vehicle, for example in order to increase the degree of detail of the map data or to validate the plausibility of specific building-side objects contained in the map information created on the part of the vehicle.

The navigation information may include first navigation data which describe at least one navigation route segment between the first position and the second position, situated within the building, and additional navigation data which describe at least one navigation route segment between the first position and the second position, situated outside of the building. The navigation information may thus in principle be divided up into those navigation data which include navigation route segments situated within the building out of which or into which navigation is to take place, and those navigation data which include navigation route segments situated outside of the building out of which or into which navigation is to take place. As arises in the following, the respective navigation data may be (additionally) processed differently in terms of data.

For example, the additional navigation data may be supplemented, verified for plausibility, possibly even overwritten by navigation data, outside of the building, on the part of the communication device, which navigation data can be or are provided via a data or communication network (in particular a mobile phone network) that is present outside of the building. A significant advantage of the described method results from this which enables a seamless navigation of a user between corresponding areas in which no network coverage is present for the corresponding communication device and areas in which a network coverage is present (again) for the corresponding communication device. In the first areas, data required for the navigation are transferred via the motor vehicle to the communication device and may be processed on the part of the communication device for navigation purposes, in particular within the building. In the second areas, supplementary or plausibility-checked navigation data that can be or are provided via a data or communication network (in particular a mobile phone network) present outside of the building may be accessed, and these may be processed on the part of the communication device for navigation purposes.

For example, the first navigation data may describe a navigation route segment between the first position (within the building)—as mentioned, typically the park position of the motor vehicle—and a building-side exit or entrance area. The additional navigation data may accordingly describe a navigation route segment between the building-side exit or entrance area and the second position (outside of the building).

As mentioned above, the described method also enables a reverse navigation of a user from a corresponding second position (outside of the building, in particular outside of a corresponding building area in which no network coverage is present for the corresponding communication device) to a corresponding first position (within the building, in particular within a corresponding building area in which no network coverage is present for the corresponding communication device). The navigation of the user from the second position to the first position likewise takes place by means of the communication device on the basis of, or incorporating, a corresponding navigation information. For this, it is necessary to initially create a corresponding navigation information on the part of the communication device, as was described further above.

The invention also relates to a motor vehicle as well as a mobile communication device. The motor vehicle and the mobile communication device are respectively designed or set up to implement the described method. Consequently, all statements in connection with the method analogously apply to the motor vehicle and to the mobile communication device.

Further advantages, features and details of the invention arise from the practical example described in the following, as well as with reference to the drawing.

FIG. 1 shows a principle depiction for illustration of the implementation of a method according to a practical example of the invention.

The serves for the navigation of a user 1 between a first position P1 and a second position P2, or vice versa. Depending on whether the first position P1 or the second position P2 serves as a starting point, either the second position P2 or the first position P1 may be designated or considered as a destination position. In the second practical example, the first position P1 may be designated or considered as a starting position and the second position P2 as a destination position.

The first position P1 is obviously located within a building 2, which—in the practical example shown—is a parking garage having multiple upper levels above the surface of the earth and multiple lower levels below the surface of the earth.

FIG. 1 shows a top view of a lower level of the building 2. In the lower level, an exit ramp 3 arrives from a lower level situated above the lower level; departing from the lower level is an exit ramp 4 leading to an additional lower level situated below the lower level. The level has a combined entrance and exit area 5 for users 1. The entrance and exit area 5 leads into a stairwell (not shown) via which users may enter or leave the building 2.

The lower level is a building area or a part of the building 2 in which no network coverage or no network reception is present for a user-side mobile communication device 6, here in the form of a smartphone, for example. At the first position P1, the communication device 6 is not or cannot be connected with a data or communication network 7 (e.g., a mobile phone network), or can do so only with noticeable limitation. The user 1 standing next to the parked motor vehicle 8 thus may not establish a connection with the data or communication network 7 via his communication device 6. No cartographic data (shortened to map data) is (initially) available for the building 2.

Clearly, the first position P1 coincides with the park position of the motor vehicle 8 in the lower level 5. In order to arrive at the shown park position, the motor vehicle 8 would be moved along the arrow 9 relative to the shown lower level. The motor vehicle 8 therefore came from the exit ramp 3, drove in parallel along a building wall 10 in the direction of the building wall 11, turned to the left, drove again in parallel along the building wall 10, until it arrived at the shown park position.

In the shown practical example, the second position P2 that is indicated by a box is located below the building 2. In principle, however, the second position P2 could likewise be located in a building area, and thus in a part of a building 2.

As mentioned, no map data is present for the building 2. In a first step of the method, a map information KI is initially created on the part of the motor vehicle 8. The map information KI describes at least a partial area of the building 2. The map information KI is created on the basis of, e.g., generally while incorporating, a vehicle environment information created at the motor vehicle. The vehicle environment information describes objects, articles etc. in the environment around the motor vehicle 8.

The vehicle environment information is created by means of acoustic and/or optical detection sensors (not shown) at the motor vehicle for detection of objects in the environment around said motor vehicle 8. For example, corresponding detection sensors are sensors based on cameras, lasers, radar or ultrasound. Detection sensors designed as cameras may also be provided, which sensors have a detection range of 360°, for example.

The vehicle environment information is created on the basis of at least one part of corresponding detection data which map the vehicle environment from the entrance of the motor vehicle 8 into the building 2 or the respective building area (here the lower level) in which the motor vehicle 8 is turned off or parked, up to the stopping or parking space of the motor vehicle 8. The vehicle environment information accordingly includes at least a portion of the objects located in the vehicle environment, which objects have been detected in a defined building area since the entrance of the motor vehicle 8 into the building 2, up to the stopping or parking space of the motor vehicle 8.

The motor vehicle 8 includes a control device 12 which converts (in the sense of data) the detection data delivered by corresponding detection sensors into corresponding map data, and thus into a corresponding map information KI, based on suitable algorithms, for example. The creation of the map information KI may thereby take place by means of algorithms, for example as they are implemented in what are known as Simultaneous Localization and Mapping methods, abbreviated as SLAM methods.

Objects 13 at the building, generally designated as building-side semantic features or landmarks, may be extracted from the vehicle environment information and stored, specially labeled (in terms of data), in the created map information KI. The map information KI may be supplemented accordingly with specific building-side objects 13. The extraction of building-side objects 13 from the vehicle environment information takes place by means of suitable extraction algorithms as are implemented for edge detection, for example, especially also within the scope of the aforementioned SLAM method Corresponding extractable or extracted building-side objects 13 may generally be objects or articles that are structurally inseparable from the building 2 or a specific building area, or that are connected to a specific building area so as to be (non-destructively) separable. In the shown practical example, corresponding extractable or extracted objects 13 in the lower level is a door 13a provided in the entrance and exit area 5, consequently separating the lower level from the stairwell; an automatic payment machine 13b arranged next to and to the right of the door 13a; a poster or signs—for example of an emergency exit, for example for information or advertising purposes—applied to the wall, left of and next to the doors 13a; a fire extinguisher 13d attached to the building wall 10; roadway markings 13e, for example to mark traffic lanes or parking or stopping spaces on the floor; as well as a structuring of the building wall 11 that is formed by recesses 13f. In particular, objects 13 that typically have standardized dimensions—doors 13a, for example—may be detected by means of suitable edge detection methods and extracted. Especially normal or standardized objects, for example doors 13a or defined signs (for example signs for emergency exits) are thereby comparably simple to detect due to their normalized or standardized dimensions, shapes and possibly colorations.

In a second step of the method, a parking information PI is provided on the part of the motor vehicle 8. The parking information PI includes the, or in general, a park position PI of the motor vehicle 8 within the building 2. Data about the position of a stopping location or of a parking space of the motor vehicle 8 within the building 2 are thus present in the parking information PI. The provision of the parking information PI may take place via transfer of these from a building-side data server (not shown) storing corresponding parking information PI to the motor vehicle 8, e.g., into a motor vehicle-side data storage. However, it is also possible that the motor vehicle 8 itself creates corresponding parking information PI. For example, this may take place by means of motor vehicle-side position determination devices (not shown) for determining the position of the motor vehicle 8 within the building 2.

The map information KI and the parking information PI may be connected to one another in terms of data (e.g., merged, for example) so that a corresponding park position mapped via the parking information PI may be referenced with map data of the building 2 that are mapped via a map information KI.

In a third step of the method, the map information KI as well as parking information PI are transferred from the motor vehicle 8 to the user-side communication device 6. The transfer is indicated by the arrow 14. For this, a suitable data or communication connection is to be formed or established between the motor vehicle 8 and the communication device 6. For example, it may thereby be a Bluetooth connection or a wireless network connection on the part of the motor vehicle, for example a local motor vehicle-side WLAN. After the transfer, the map information KI and the parking information PT are thus (also) available in the communication device 6.

The map information KI and parking information PI that are now available in the communication device 6 are processed in conjunction with a navigation of the user 1 that is realized via the communication device 6. In a fourth step of the method, a navigation information NI is created by the communication device 6 on the basis of the map information KI and the parking information PI. The navigation information NI includes at least one navigation route between the first position P1 and the second position P2, meaning at least one distance to be traveled by the or a user in order to arrive from the first position P1 at the second position P2.

In a fifth step of the method, a navigation of the user 1 from the first position P1 to the second position P2 takes place on the basis of the navigation information NI. Acoustic and/or optical and/or haptic signals are thus provided to the user 1 via output means present at the communication device 6, using which signals he can be navigated from the first position P1 to the second position P2. Concretely, graphical elements (arrows, for example) may thereby be presented to the user 1 on a display at the communication device, for example, which graphical elements indicate to him the path from the first position P1 to the second position P2.

The communication device 6 may create environment information describing an object in the environment around the communication device 6. In contrast to the vehicle environment information created on the part of the motor vehicle, the environment information created on the part of the communication device thus describes objects in the environment around the communication device 6, such that it is not the motor vehicle 8 but rather the communication device 6 that serves as a reference point. It may be possible to extract specific building-side objects 13 from the environment information via suitable extraction algorithms at the communication device.

The (in particular extracted) building-side objects 13, described in the environment information created by means of the communication device, may be matched with (in particular extracted) building-side objects 13 described in the map information KI transferred to the communication device 6. The navigation by means of the communication device 6 may be significantly simplified via the matching of objects 13 detected on the part of the communication device with objects 13 detected on the part of the vehicle. In particular, the plausibility of objects 13 detected on the part of the communication device and on the part of the motor vehicle may be validated.

An additional map information KI describing at least a partial area of the building 2 may be provided via the communication device 6 and transferred to the motor vehicle 8. The map information KI provided on the part of the communication device may be (down)loaded at the communication device 6 from a data or communication network 7 (in particular a mobile phone network), which is naturally only possible if the communication device 6 is connected with such a network. This is typically possible only outside of a building area in which no network coverage, and thus no network reception, is present at the communication device 6. The motor vehicle 8 may be navigated—in particular in an at least partially automated manner—on the basis of the map information KI transferred from the communication device 6 to the motor vehicle 8. It is also possible to merge the map information KI transferred on the part of the communication device 6 to the motor vehicle 8 with map information KI created previously on the part of the motor vehicle, for example in order to increase the degree of detail of the map data or to validate the plausibility of specific building-side objects 13 contained in the map information KI created on the part of the vehicle.

The navigation information NI may include first navigation data which describe at least one navigation route segment between the first position P1 and the second position P2, situated within the building 2, and additional navigation data which describe at least one navigation route segment between the first position P1 and the second position P2, situated outside of the building 2. The navigation information NI may thus in principle be divided up into those navigation data which include navigation route segments situated within the building 2 out of which or into which navigation is to take place, and those navigation data which include navigation route segments situated outside of the building 2 from which or into which navigation is to take place.

The additional navigation data may be supplemented, verified for plausibility, possibly even overwritten by navigation data, outside of the building 2, on the part of the communication device 6, which navigation data can be or are provided via a data or communication network 7 (in particular a mobile phone network) that is present outside of the building 2. A significant advantage of the method results from this which enables a seamless navigation of a user 1 between corresponding areas in which no network coverage is present for the communication device 6 and areas in which a network coverage is present (again) for the corresponding communication device 6. In the first areas, data required for the navigation are transferred via the motor vehicle 8 to the communication device 6 and may be processed on the part of the communication device 6 for navigation purposes, in particular within the building 2. In the second areas, supplemented or plausibility-checked navigation data that can be or are provided via a data or communication network 7 (in particular a mobile phone network) present outside of the building 2 may be accessed, and these may be processed on the part of the communication device 6 for navigation purposes.

The first navigation data may describe a navigation route segment between the first position P1 (within the building), e.g., typically the park position of the motor vehicle 8, and a building-side entrance or exit area via which users 1 may enter the building 2 and leave the building 2. The additional navigation data may accordingly describe a navigation route segment between the building-side exit or entrance area and the second position P2 (outside of the building).

The method naturally also allows a reverse navigation of the user 1 from the second position P2 to the first position P1. The navigation of the user 1 from the second position P2 to the first position P1 likewise takes place by means of the communication device 6 on the basis of, or incorporating, the navigation information NI. Here it is required to initially create—as described—a corresponding navigation information NI on the part of the user-side mobile communication device 6.

The invention claimed is:

1. A method for navigating a user between a first position within a building and a second position, wherein the first position is a park position of a motor vehicle parked in the building, the method comprising:
   creating, by the motor vehicle, map information describing at least one partial area of the building based on vehicle environment information created at the motor vehicle that describes objects in an environment around the motor vehicle;
   providing, by the motor vehicle, parking information including the park position of the motor vehicle within the building; and
   transferring the map information and the parking information from the motor vehicle to a user-side mobile communication device,
   wherein the user-side mobile communication device is configured to create navigation information comprising at least one navigation route between the first position and the second position, based on the transferred map information and the transferred parking information,
   wherein the user-side mobile communication device is configured to navigate the user between the first position and the second position based on the navigation information, and
   wherein the navigation information comprises at least one distance to be traveled by the user in order to arrive from the first position at the second position or from the second position at the first position.

2. The method of claim 1, further comprising:
   extracting building-side objects from the vehicle environment information; and
   storing the building-side objects, specially labeled, in the map information.

3. The method of claim 2, wherein the building-side objects comprise objects that are structurally inseparable from the building or are connected so as to be separable.

4. The method of claim 1, wherein the user-side mobile communication device is configured to create second environment information describing a second set of objects in an environment around the user-side mobile communication device.

5. The method of claim 4, wherein:
   the second set of objects comprise second building-side objects in the environment around the user-side mobile communication device, the second building-side objects are described in the second environment information created by the user-side mobile communication device, and
   the second building-side objects in the environment around the user-side mobile communication device are matched with first building-side objects described in the map information transferred to the user-side mobile communication device.

6. The method of claim 1, wherein the first position is situated in a building area in which no network coverage is present for the user-side mobile communication device.

7. The method of claim 1, wherein additional map information describing the at least one partial area of the building is provided by the user-side mobile communication device and the method further comprises:
   receiving, by the motor vehicle, the additional map information.

8. The method of claim 1, further comprising:
creating the vehicle environment information using a motor vehicle-side acoustic or optical detection sensor for detecting the objects in the environment around the motor vehicle.

9. The method of claim 1, wherein the navigation information comprises:
first navigation data describing a first navigation route segment between the first position and the second position, the first navigation route segment is situated within the building; and
second navigation data describing a second navigation route segment between the first position and the second position, the second navigation route segment is situated outside of the building.

10. The method of claim 9, wherein the user-side mobile communication device is configured to:
receive, outside the building and via a communication network existing outside of the building, third navigation data; and
check the second navigation data for plausibility using the third navigation data.

11. The method of claim 9, wherein the user-side mobile communication device is configured to:
receive, outside the building and via a communication network existing outside of the building, third navigation data; and
supplement the second navigation data with the third navigation data.

12. The method of claim 9, wherein:
the first navigation data further describe a third navigation route segment between the first position and a building-side exit or a building-side entrance area, and
the second navigation data further describe a fourth navigation route segment between the building-side exit or the building-side entrance area and the second position.

13. A system for navigating a user between a first position within a building and a second position, wherein the first position is a park position of a motor vehicle parked in the building, the system comprising:
the motor vehicle, wherein the motor vehicle is configured to:
create map information describing at least one partial area of the building based on vehicle environment information created at the motor vehicle that describes objects in an environment around the motor vehicle,
provide parking information including the park position of the motor vehicle within the building, and
transfer the map information and the parking information to a mobile communication device; and
the mobile communication device, wherein the mobile communication device is configured to:
create navigation information comprising at least one navigation route between the first position and the second position, based on the transferred map information and the transferred parking information, and
navigate the user between the first position and the second position based on the navigation information,
wherein the navigation information comprises at least one distance to be traveled by the user in order to arrive from the first position at the second position or from the second position at the first position.

14. The system of claim 13, wherein the motor vehicle is further configured to:
extract building-side objects from the vehicle environment information; and
store the building-side objects, specially labeled, in the map information.

15. The system of claim 13, wherein the mobile communication device is further configured to create second environment information describing a second set of objects in an environment around the user-side mobile communication device.

16. The system of claim 13, wherein the first position is situated in a building area in which no network coverage is present for the mobile communication device.

17. The system of claim 13, wherein:
the mobile communication device is configured to provide an additional map information describing the at least one partial area of the building; and
the motor vehicle is configured to receive the additional map information.

18. The system of claim 13, wherein the motor vehicle is further configured to create the vehicle environment information using at least one motor vehicle-side acoustic and/or optical detection sensors for detecting the objects in the environment around the motor vehicle.

19. The system of claim 13, wherein the navigation information comprises:
first navigation data describing a first navigation route segment between the first position and the second position, wherein the first navigation route segment is situated within the building; and
second navigation data describing a second navigation route segment between the first position and the second position, wherein the second navigation route segment is situated outside of the building.

* * * * *